May 14, 1929.　　　C. A. VENTRESS　　　1,712,913
CANE HARVESTER
Filed March 19, 1926　　　5 Sheets-Sheet 2
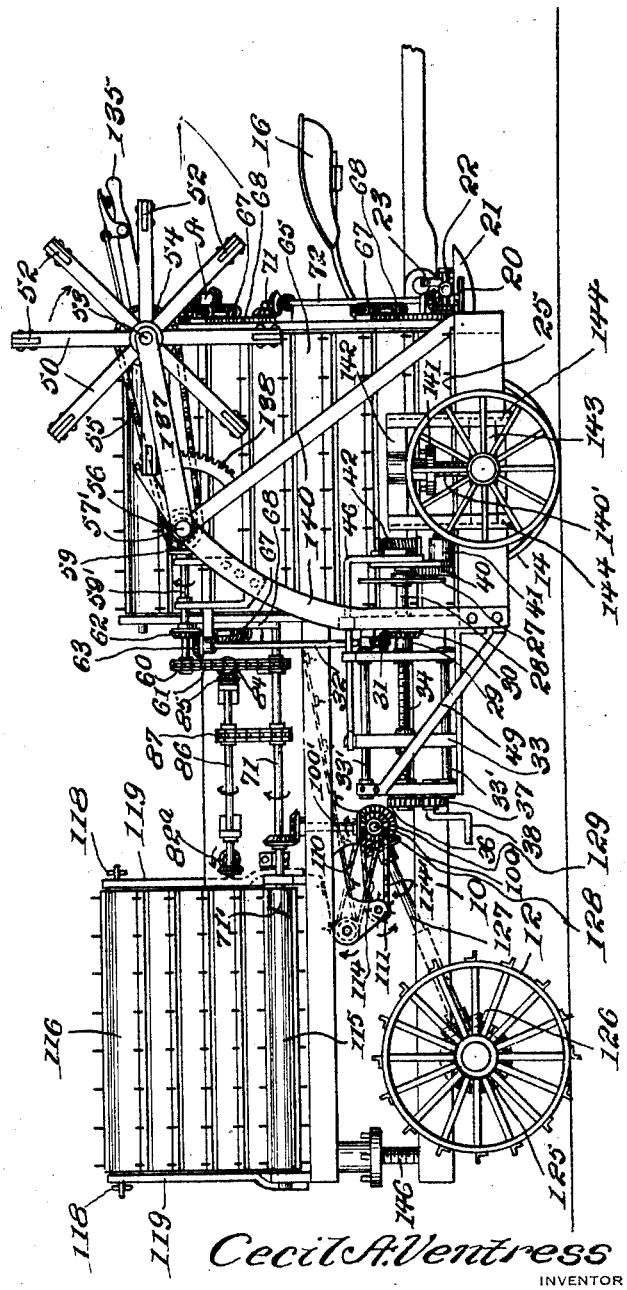

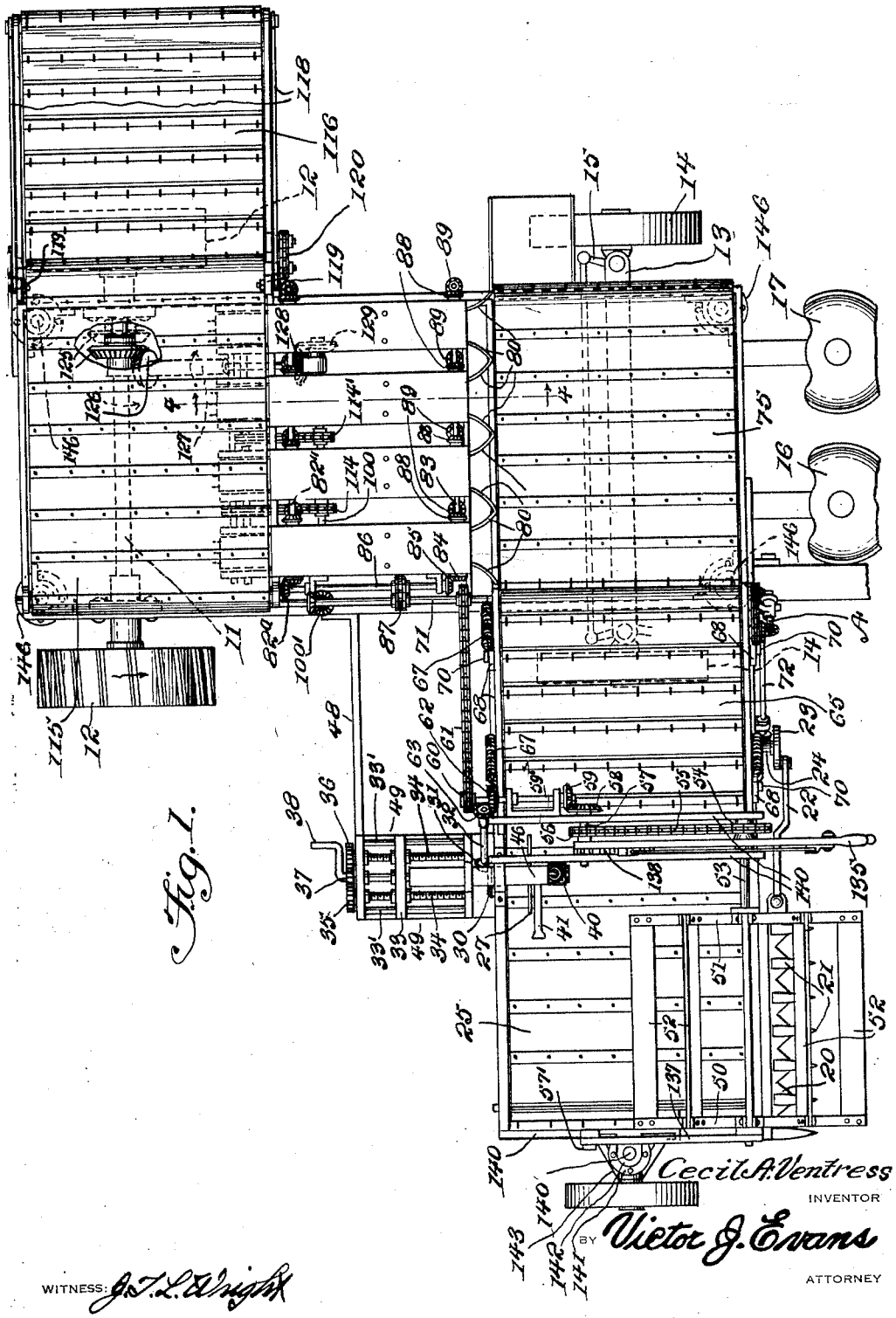

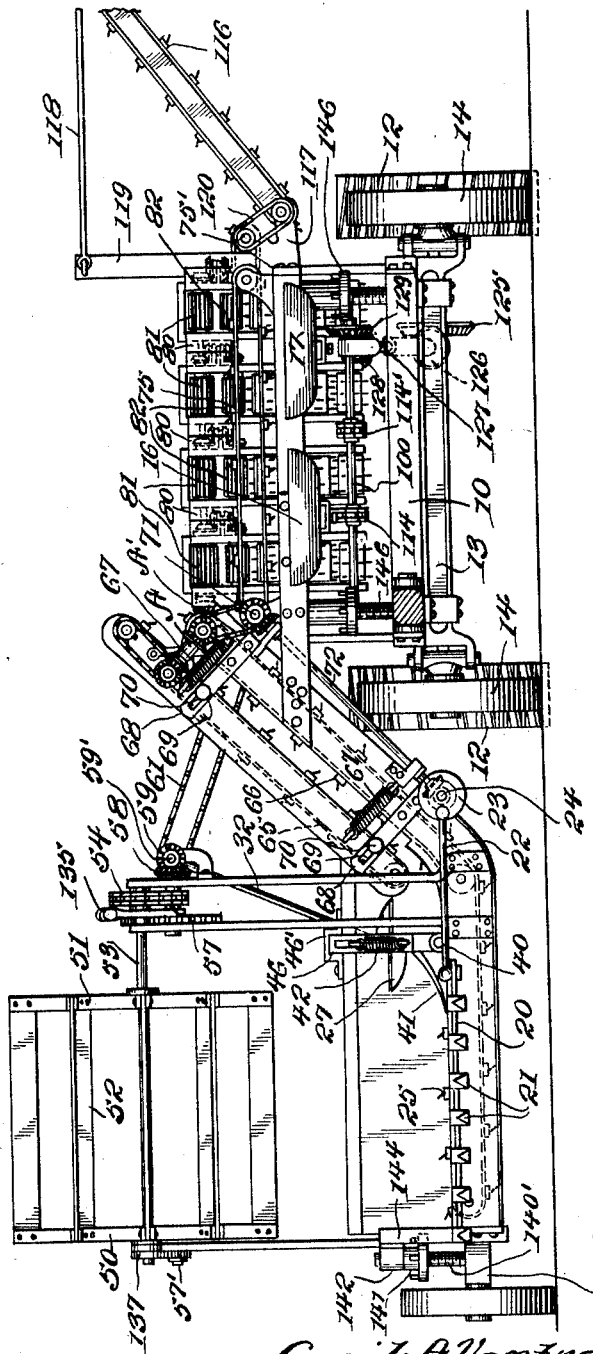

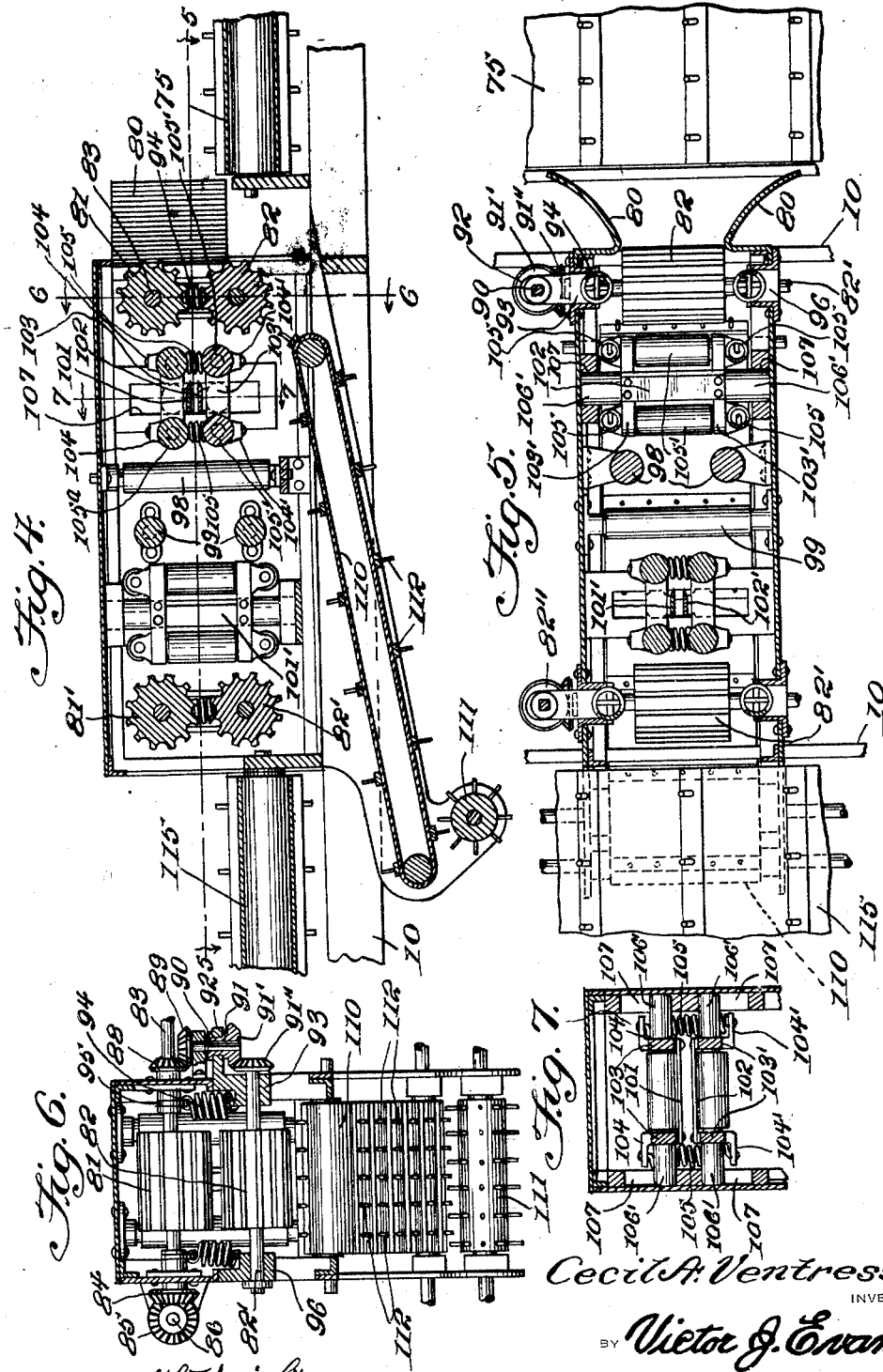

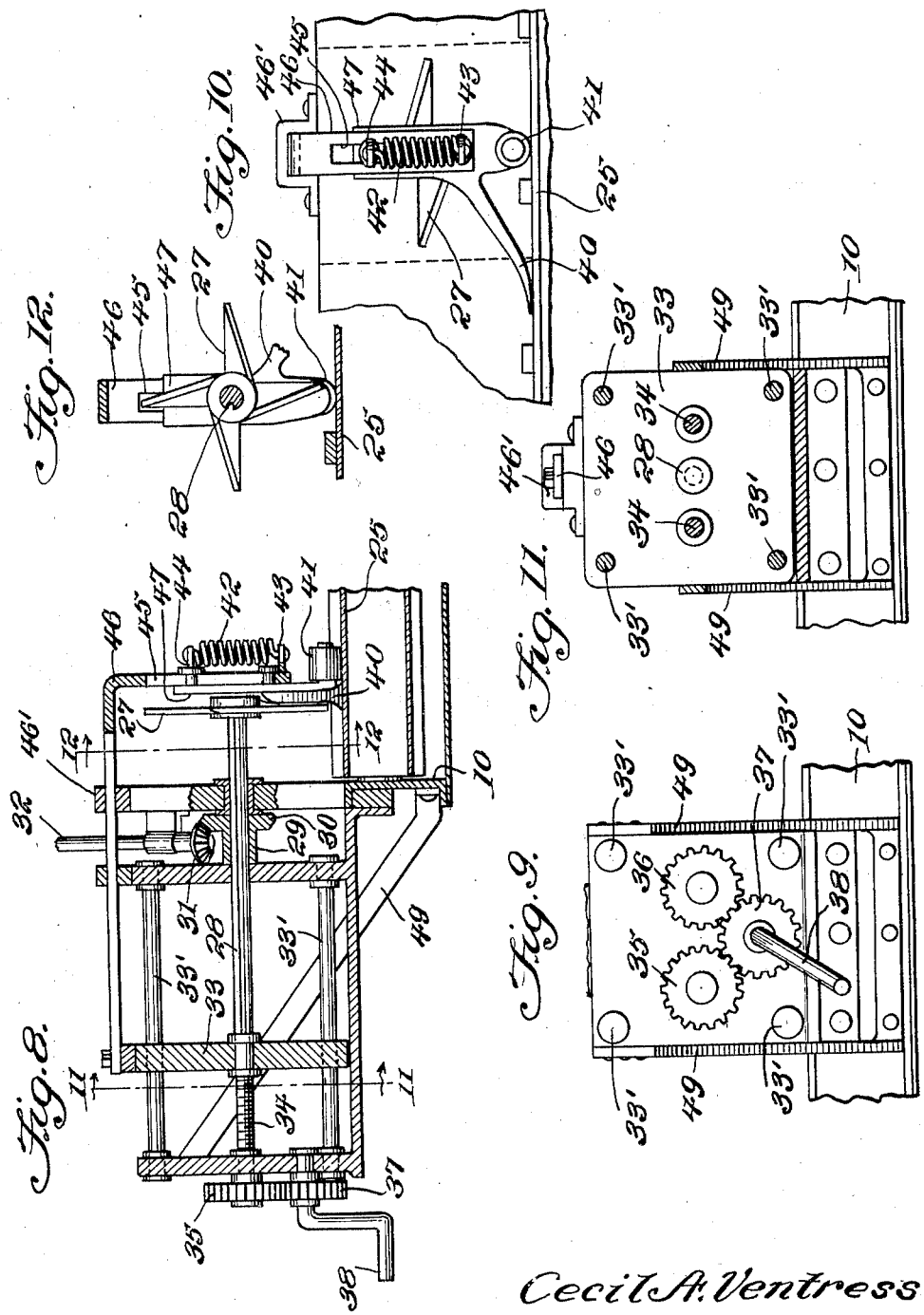

Patented May 14, 1929.

1,712,913

UNITED STATES PATENT OFFICE.

CECIL A. VENTRESS, OF DUBBERLY, LOUISIANA.

CANE HARVESTER.

Application filed March 19, 1926. Serial No. 95,954.

The object of this invention is to provide, in a cane harvester, certain novel mechanisms for topping and stripping the stalks, with means associated therewith, and involving special construction, for performing the entire operation of cutting the cane, transferring it to position for feeding manually to the strippers, and means for receiving the material coming from the strippers, whence it passes to a loading device.

A further object is to provide certain novel mechanisms for imparting movement to all of the devices acting on the material from the time it is first cut, to the time it is discharged from the loading conveyor.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a top plan view of the machine.

Figure 2 is a view in side elevation.

Figure 3 is a view in front elevation.

Figure 4 is a view of the stripping mechanism, in vertical section, the view being on line 4—4 of Figure 1.

Figure 5 is a view on line 5—5 of Figure 4, showing the stripping mechanism in horizontal section and top plan.

Figure 6 is a section on line 6—6 of Figure 4.

Figure 7 is a section on line 7—7 of Figure 4.

Figure 8 is a view in section showing the topping device.

Figure 9 is an elevation, looking from the left in Figure 8.

Figure 10 is an elevation, looking from the right in Figure 8.

Figure 11 is a vertical section on line 11—11 of Figure 8.

Figure 12 is a section on line 12—12 of Figure 8.

A main frame is designated 10, a rear axle 11 therefor carries ground wheels such as 12, and a front axle 13 carries wheels 14 controlled by steering mechanism shown conventionally at 15. Seats 16 and 17 are provided for two workmen who manually transfer the cane to the stripping mechanism.

A cutting blade 20 cooperates with the teeth 21, and the blade is reciprocated by pitman 22 having crank connection with wheel 23 on shaft 24. The cane stalks pass to conveying device 25, and the tops are severed by the topping mechanism of Figure 8, the details of which are shown in Figures 9 to 12 inclusive. The cutter 27 is mounted on shaft 28 mounting a sleeve 29 carrying gear wheel 30 meshing with gear wheel 31 on shaft 32, and the position of the cutter 27 may be varied by adjusting the shaft 28 longitudinally, this shaft being slidable through sleeve 29, and being rotatably mounted with reference to head or the like 33, the position of which is determined by screws 34, mounting respectively gear wheels 35 and 36 meshing with gear wheel 37, controlled by crank handle 38.

The stalks are temporarily held while being topped, by a cane lifting finger 40, the heel portion mounting a roller 41, and the device being vertically movable or yieldable under the action of spring 42 having its lower end mounted at 43, and its upper end connected with the laterally extending element 44, constituting a guiding device and projecting through slot 45 of bar 46. The element 44 is connected with the vertical member 47 by which the cane lifting finger is carried, this element 47 having flanges cooperating with the edge portions of the member 46. The position of the topping mechanism, relative to the other principal parts of the machine, is shown in Figure 1, and bracing and retaining devices 48 and 49 are shown respectively in Figures 1 and 8. A reel or drum mounted above the conveyor 25 includes the end portions 50 and 51, the transverse elements 52 as illustrated, and the shaft 53 mounting sprocket wheel 54 driven by chain 55 passing over sprocket wheel 56 on shaft 57. The shaft last named is driven by gear wheels 58 and 59, one of which is rigid with reference to a pulley 60 over which belt 61 passes. The pulley 60 is in fact carried by shaft 59' carrying wheel 59 and also carrying a gear wheel 62 meshing with gear wheel 63 on shaft 32 previously referred to and driving the topping mechanism of Figure 8. In adjusting the position of the topping cutter 27, in accordance with the length of the stalks, the head 33 slides along rods 33' acting as guiding devices. The bar 46 is also slidable through the guide element 46', so that correct relative position between the elements at the right of Figure 8 may be maintained.

After the tops have been cut, the stalks pass between upper and lower conveyors, inclined as shown in Figure 3 and designated 65 and 66, these conveyors including convas belts carrying transverse slats, with teeth projecting therefrom in the direction illustrated. The upper conveyor 65, or the frame thereof is vertically or upwardly movable with reference to conveyor 66, and is held by springs such as 67. Standards 68 are slotted at 69, and the bolts or lugs 70 extending laterally from the conveyor frame are adjustable with reference to the slots in the standards.

The conveyors 65 and 66 are driven from suitable gearing such as that shown conventionally at A in Figure 3 and which is believed to require no detailed description. This gearing A has operative connection by means of chain or belt A' with shaft 71 from which shaft 72 is driven by suitable gearing, and shaft 72 drives gearing for shaft 24 through which motion is imparted to the reciprocable cutter 20.

A conveyor 75 receives the stalks from the conveyors 65 and 66, and brings them to position opposite the operators who manually convey the stalks to the stripping devices.

When the stalks are passed from conveyor 75 by the operators, they enter between the guards 80, and pass between rollers 81 and 82 of Figure 4, the upper roller being mounted on shaft 83 which drives the series of upper rollers of the stripping devices, this shaft 83 carrying a gear wheel 84 driven by gear wheel 85 on shaft 86, driven from shaft 71 through sprocket chain 87.

Shaft 83 of Figure 6 carries gear wheel 88 meshing with gear wheel 89 on square shaft 90, the latter entering the square socket in sleeve 91 rotatable in vertically movable element 92. The latter carries a journal box 93 connected by spring 94 with collar 95 on shaft 83. Journal box 96 is similarly mounted, and the lower roller 82 is therefore resiliently held with reference to roller 81. Roller 82 is driven by gearing 91' and 91" and shaft 82'.

The cane passes through or between rollers 81 and 82, corrugated as shown, and passes thence between knives 101 and 102, mounted on bars 103, 103' of Figure 7, these bars carrying ears 104, connected by coiled springs 105 with ears 104' on bars 103'.

The rollers 105ᵃ of the upper pair, and the rollers 105' of the lower pair, extend between bars 103, 103', and these bars are slidable vertically on account of their connection with blocks or the like 106', vertically movable in slots or guides 107. The rollers just described, and the knives 101, 102 are therefore automatically adjustable for accommodating cane of different sizes, and act to strip the leaves from the stalks. Two pairs of rollers 98 and 99 guide the cane between the two pairs of knives illustrated.

The rollers 81' and 82' are mounted in the same manner as rollers 81 and 82, and the knives 101' and 102' and their associated rollers are automatically movable, but are mounted on vertical axes, as shown in Figures 4 and 5, so that practically all sides of the stalks will be operated upon. Rollers 81', 82' are driven from shaft 82" of Figure 1, geared at 82ᵃ, Figure 2 to shaft 86.

The waste material is removed by lower conveyor 110, and a toothed roller 111, driven by chain 114' from shaft 100, removes any material adhering to the teeth 112 carried by the slats of the conveyor 110.

The drive for conveyor 110 is through chain 114, and suitable gearing, from transverse shaft 100, and the latter drives, through suitable gearing, vertical shaft 100' in the central portions of Figures 1 and 2, the shaft 100' driving, through gearing, shaft 71 carrying roller 71' for driving conveyor 115 which receives the material from the stripping device or devices, when it is moved by discharge conveyor or loading conveyor 116. The frame of the loading conveyor is mounted in supporting devices, such as 117, and tie members 118 extend to the outer end of the frame, and are connected with standards 119. The drive for this conveyor is through chain 120 operatively connected with conveyor shaft 75', which is driven by the conveyor 75 per se.

The main axle 11 carries a gear wheel 125 meshing with gear wheel 126 on shaft 127, formed in relatively slidable section, and geared to transverse shaft 100, this gearing including beveled gear wheels 128, 129 of Figure 1. Gear wheel 125 may be thrown to dotted line position of Figure 1, for discontinuing the drive.

A lever 135 appearing in Figures 1 and 2 is fulcrumed on shaft 57, and controls the elevation of the reel including elements 50, 51, 52, said reel being mounted between arms 137 movable above axial points 57, 57'. Shaft 53 passes through lever 135, this being the shaft of the reel, and is moved by the lever in an arc-shaped path, for changing its horizontal position and the position of the reel. The lever 135 cooperates with segment 138, and the elevation of the reel above the conveyor 25 may therefore be changed, the arms 137, moving angularly with reference to the stationary frame 140. The drive for the reel through the chain and sprocket wheel connection between shafts 57 and 53 permits this movement of the reel.

At the left of Figures 1 and 3, means for raising the upper structure are illustrated, these means including a jack screw 140' and a threaded device 141 bearing against stationary element 142, the screw bearing on a wheel mounting device 143 which is slidable in vertical guides 144 appearing in side elevation in Figure 2. In Figure 3, two other jacks are shown in full lines, and in Figure 1, four jacks, including those of Figure 3, are illustrated in dotted lines, and are designated 146.

Having thus described the invention, what is claimed as new, is:—

1. In a cane harvester, horizontally adjustable stalk cutting means, a horizontal conveyor for receiving the stalks from the cutting means, a rotary top cutting device mounted in a vertical plane, a finger projecting over the conveyor, adjacent to the top cutting device for engaging the stalks while being topped, an elevating conveyor for moving material from the conveyor first named, a third conveyor receiving material from the elevating conveyor, stripping means mounted along side the third conveyor, and means for disposing of material received from the stripping means.

2. In a cane harvester, a horizontal conveyor for stalks, and topping mechanism associated with said conveyor and including a rotatable cutter, a horizontal shaft carrying the cutter, a slidable device for moving the shaft and cutter horizontally across a portion of the conveyor, for treating stalks of different lengths, and means for advancing and retracting the slidable device.

3. In a cane harvester, a horizontal conveyor for stalks, and topping mechanism associated with said conveyor and including a rotatable cutter, a shaft carrying the cutter, a slidable device for moving the shaft and cutter horizontally across a portion of the conveyor, for cutting stalks of different lengths, and means for advancing and retracting the slidable device, these means comprising threaded devices, and means for rotating the threaded devices.

4. In a cane harvester, a horizontal conveyor for stalks, and topping mechanism associated with said conveyor and including a rotatable cutter, a shaft carrying the cutter, a slidable device for moving the shaft and cutter horizontally across a portion of the conveyor, for cutting stalks of different lengths, and means for advancing and retracting the slidable device, and means for engaging the stalks while being acted upon by the cutter.

5. In a cane harvester, a horizontal conveyor for stalks, and topping mechanism associated with said conveyor and including a rotatable cutter, a shaft carrying the cutter, a slidable device for moving the shaft and cutter horizontally across a portion of the conveyor, for treating stalks of different lengths, means for advancing and retracting the slidable device, and means for engaging the stalks while being acted upon by the cutter, the means last named including a finger positioned adjacent to the conveyor and a resiliently mounted element carrying the finger and projecting into the path of the conveyor.

6. In a cane harvester, stalk stripping means comprising a plurality of pairs of rollers mounted on horizontal axes, and intermediate devices including two pairs of knives between which the stalks are passed, the knives of one pair being perpendicular to the knives of the other pair, and means permitting the knives of each pair to move relatively and simultaneously with the rollers of each pair.

7. In a cane harvester, stalk stripping means including a plurality of pairs of rollers mounted on horizontal axes, a pair of horizontally mounted knives adjacent to one pair of said rollers, means for resiliently mounting the knives, rollers directly associated with said knives and adjacent thereto, and means permitting vertical movement of the rollers last named, and the knives, in one operation.

8. In a cane harvester, stalk stripping means comprising upper rollers and lower rollers, and intermediate devices, said intermediate devices including a plurality of pairs of knives mounted perpendicularly with reference to each other, stalk guiding means parallel with each knife and movable therewith and relatively to the other knives and guiding means, and a plurality of pairs of rollers mounted between the pairs of knives and perpendicularly with reference to each other.

9. In a cane harvester, cane stripping means including a pair of resiliently mounted rollers between which the cane is to be fed, a plurality of pairs of knives, the knives of the respective pairs being perpendicular with reference to each other, rollers directly associated with said knives, these rollers and the knives being automatically adjustable with reference to the size of the cane stalks, the rollers being assembled in pairs and each pair being movable simultaneously with one of the knives and adjustable therewith, and guiding rollers mounted between the pairs of knives.

In witness whereof I affix my signature.

CECIL A. VENTRESS.